United States Patent
Tsuchiya

(10) Patent No.: US 7,528,910 B2
(45) Date of Patent: May 5, 2009

(54) LIQUID CRYSTAL DISPLAY DEVICE AND ELECTRONIC APPARATUS

(75) Inventor: Hitoshi Tsuchiya, Nagano (JP)

(73) Assignee: Seiko Epson Corporation (JP)

( * ) Notice: Subject to any disclaimer, the term of this patent is extended or adjusted under 35 U.S.C. 154(b) by 631 days.

(21) Appl. No.: 11/211,022

(22) Filed: Aug. 24, 2005

(65) Prior Publication Data

US 2006/0050212 A1    Mar. 9, 2006

(30) Foreign Application Priority Data

Sep. 9, 2004    (JP) ............................. 2004-262272

(51) Int. Cl.
*G02F 1/1335*    (2006.01)

(52) U.S. Cl. .................. 349/114; 349/139; 349/129; 349/113

(58) Field of Classification Search ................ 349/114, 349/178, 125, 129, 130, 96, 117, 139, 143, 349/113, 123
See application file for complete search history.

(56) References Cited

U.S. PATENT DOCUMENTS

| | | | |
|---|---|---|---|
| 6,215,538 B1 | 4/2001 | Narutaki et al. | |
| 6,330,047 B1 | 12/2001 | Kubo | |
| 6,624,860 B1 | 9/2003 | Narutaki et al. | |
| 6,788,375 B2 * | 9/2004 | Ogishima et al. | 349/130 |
| 6,906,765 B2 | 6/2005 | Narutaki et al. | |
| 7,250,998 B2 | 7/2007 | Narutaki et al. | |
| 2005/0174528 A1 | 8/2005 | Kubo | |

FOREIGN PATENT DOCUMENTS

| | | |
|---|---|---|
| JP | 11-242226 | 9/1999 |
| JP | 2000-111902 | 4/2000 |
| JP | 2002-350853 | 12/2002 |
| KR | 2001-0085598 | 9/2001 |
| KR | 10-0332519 | 4/2002 |

* cited by examiner

*Primary Examiner*—Thoi V Duong
(74) *Attorney, Agent, or Firm*—Harness, Dickey & Pierce, P.L.C.

(57) ABSTRACT

A liquid crystal display device includes: a pair of substrates including an element substrate and a counter substrate; a liquid crystal layer interposed between the pair of substrates, the liquid crystal layer being composed of liquid crystal having negative dielectric anisotropy, an initial alignment state thereof being vertical; pixel electrodes provided on the element substrate to drive the liquid crystal layer; and a transmissive display region for transmissive display and a reflective display region for reflective display provided within one dot region. At least an outer region of the pixel electrodes and a region overlapping edges of the pixel electrodes in plan view become the reflective display region, and the thickness of the liquid crystal layer in the reflective display region is approximately equal to that of the liquid crystal layer in the transmissive display region.

12 Claims, 10 Drawing Sheets

LIQUID CRYSTAL DISPLAY DEVICE AND ELECTRONIC APPARATUS

RELATED APPLICAATIONS

This application claims priority to Japanese Patenet Application No. 2004-262272 filed Sep. 9, 2004 which is hereby expressly incorporated by reference herein in its entirety.

BACKGROUND OF THE INVENTION

1. Technical Field

The present invention relates to a liquid crystal display device and an electronic apparatus, and in particular, to a technique capable of realizing high contrast and wide viewing angle in a transflective liquid crystal display device having both reflective and transmissive modes.

2. Related Art

There has been suggested a liquid crystal display device in which images can be viewed by using external light in a bright place, as in a reflective liquid crystal display device, and by using an internal light source, such as a backlight or the like, in a dark place. Such a liquid crystal display device employing both reflective and transmissive modes switches between both the modes depending on the ambient brightness. This allows clear display even in a dark place as well as reduction of power consumption. For this reason, such a liquid crystal display device is particularly suitable for a display unit of a portable apparatus or the like. Hereinafter, this kind of liquid crystal display device is referred to as a 'transflective liquid crystal display device' in this specification.

As such a transflective liquid crystal display device, there has been suggested a liquid crystal display device in which a liquid crystal layer is interposed between an upper substrate and a lower substrate, and a reflection film, which is a metal film made of aluminum or the like and has openings for transmitting light formed thereon, is provided on an inner side of the lower substrate, the reflection film serving as a transflective plate. In this case, in the reflective mode, external light incident on the upper substrate side passes through the liquid crystal layer, is then reflected from the reflection film provided on the inner side of the lower substrate to pass through the liquid crystal layer again, and is then emitted from the upper substrate side to display images. On the other hand, in the transmissive mode, light emitted from a backlight, that is, light incident on the lower substrate side passes through the liquid crystal layer via the openings of the reflection film and is then emitted to the outside from the upper substrate side. Accordingly, of a region where the reflection film is formed, a region where the openings are formed becomes a transmissive display region and the remaining region becomes a reflective display region.

However, the transflective liquid crystal display device in the related art has a drawback due to a narrow viewing angle in the transmissive mode. This disadvantage results from the lack of freedom in optical design with the restriction that the reflective display has to be achieved by a single polarization plate provided at a viewer side because a transflective plate is provided on an inner side of a liquid crystal cell so that parallax does not occur. Accordingly, in order to eliminate such a drawback, there has been suggested a new transflective liquid crystal display device using vertical alignment. This new transflective liquid crystal display device has three characteristics, as follows:

(1) 'VA (Vertical Alignment) mode'—in which liquid crystal having negative dielectric anisotropy is vertically aligned with respect to a substrate and this alignment is destroyed by applying a voltage.

(2) 'multi-gap structure'—in which the thickness of the liquid crystal layer (a cell gap) in a transmissive display region is different from that of the liquid crystal layer in a reflective display region (for example, see Japanese Unexamined Patent Application Publication Nos. 11-242226 and 2002-350853).

(3). 'alignment division structure'—in which projections are provided,in the center of the transmissive display region on a counter substrate such that the liquid crystal falls down in eight directions in a regular octagonal transmissive display region.

For example, Japanese Unexamined Patent Application Publication No. 2002-350853 adopts the multi-gap structure. This is to optimize the retardation (phase difference) required for the transmissive display and the retardation required for the reflective display, since light contributing to displaying images passes through the liquid crystal layer once for the transmissive display while passing through the liquid crystal layer twice for the reflective display. In order to realize the multi-gap structure, it is common to make the thickness of the liquid crystal layer in a reflective display region equal to about half of the thickness of the liquid crystal layer in a transmissive display region by forming a resin layer in the reflective display region, for example, to form a step difference between the reflective display region and the transmissive display region.

However, when realizing such a structure within a liquid crystal cell, it is difficult to form the step difference and to prevent a slope (an inclined portion) of the resin layer from being generated at a boundary between the transmissive display region and the reflective display region. For this reason, the liquid crystal located at the slope of the resin layer is aligned obliquely with respect to a substrate surface although it is in a vertical alignment mode, which causes deterioration of display contrast.

SUMMARY

An advantage of the invention is that it provides a transflective liquid crystal display device having high contrast while retaining the benefit of the vertical alignment mode, such as a wide viewing angle.

According to an aspect of the invention, a liquid crystal display device of the invention includes: a pair of substrates including an element substrate and a counter substrate; a liquid crystal layer interposed between the pair of substrates, the liquid crystal layer being composed of liquid crystal having negative dielectric anisotropy, an initial alignment state thereof being vertical; pixel electrodes provided on the element substrate to drive the liquid crystal layer; and a transmissive display region for transmissive display and a reflective display region for reflective display provided within one dot region. Also, at least an outer region of the pixel electrodes and a region overlapping edges of the pixel electrodes in plan view become the reflective display region, and the thickness of the liquid crystal layer in the reflective display region is approximately equal to that of the liquid crystal layer in the transmissive display region.

The liquid crystal display device of the invention is achieved by combining the transflective liquid crystal display device and liquid crystal in the vertical alignment mode. As described previously, in order to overcome a problem of deterioration of contrast due to a difference in retardation between the reflective mode and the transmissive mode in recent transflective liquid crystal display devices, there has been suggested the so-called multi-gap structure in which the thickness of the liquid crystal layer in the reflective display region and the transmissive display region is modified by, for example, making the resin layer having a predetermined thickness in the reflective display region on the substrate protruding toward the liquid crystal layer. Various applications in connection with this kind of liquid crystal display device have been already filed by the applicant. With this configuration, since the thickness of the liquid crystal layer in the reflective display region can be smaller than the thickness of the liquid crystal layer in the transmissive display region due to the existence of the resin layer, the retardation in the reflective display can become approximately equal to the retardation in the transmissive display, which theoretically results in improvement of contrast. However, in actuality, deterioration of contrast occurred due to the slope of the resin layer.

So, in consideration of the above, the inventors paid attention to an aspect that different retardations necessarily occur within one dot region in a liquid crystal display. device of a vertical alignment mode even though the multi-gap structure is not employed. That is, in an active-matrix-type liquid crystal display device having one pixel electrode within one dot region, since an electric field is not applied to a region between adjacent pixel electrodes, liquid crystal molecules do not fall down in these regions. On the other hand, in the middle region of the pixel electrode, the liquid crystal molecules fall down in a horizontal direction when the electric field is applied. Further, in an edge of the pixel electrode, which is an intermediate region between the region between adjacent pixel electrodes and the middle region of the pixel electrode, since the electric field is applied to the liquid crystal layer in a direction inclined from the normal line direction of the substrate surface, the liquid crystal molecules fall down halfway. Accordingly, the retardation continues to become small from the middle region of the pixel electrode to the edge of the pixel electrode 9 and then the region between adjacent electrodes (an outer side of the pixel electrode). Accordingly, by using an outer region of the pixel electrode and a region corresponding to the edge of the pixel electrode as the reflective display region and using other remaining regions as the transmissive display region, the retardation in the reflective display region can be smaller than the retardation in the transmissive display region without employing the multi-gap structure, thereby improving contrast in both of the reflective display and transmissive display. With this configuration, since an adverse effect caused by the resin layer in the multi-gap structure can be eliminated, a liquid crystal display device having high contrast can be realized.

In the above configuration of the invention, preferably, an alignment controller that controls an alignment direction of the liquid crystal layer is further provided in a region of the counter substrate which overlaps the pixel electrodes in plan view. The alignment controller may include an opening formed in an electrode or a convex portion (protrusion) formed on an electrode.

As described above, since the electric field applied to the liquid crystal layer at the edge of the pixel electrode in the direction inclined with respect to the normal line direction of the substrate can drop the liquid crystal molecules down in a radial direction, it is possible to control. the direction of alignment. However, since this electric field does not necessarily provide a sufficient alignment control, the alignment control can be further intensified by forming the alignment controller at a position on the counter substrate corresponding to the middle region of the pixel electrode, for example. As a result, an alignment division structure can be reliably implemented, thereby obtaining the wide viewing angle.

In the above configuration, preferably, at least a region overlapping the alignment controller in plan view additionally becomes the reflective display region.

At the center of the alignment controller is generated a region in which most of the liquid crystal molecules do not fall down, as in the outer region of the pixel electrode, and at the edge of the alignment controller is generated a region in which the liquid crystal molecules fall down halfway, as in the edge of the pixel electrode. Accordingly, by additionally setting a region overlapping the alignment controller in plan view as the reflective display region, the retardation in the reflective display region can be smaller than that in the transmissive display region even in the set region, thereby improving contrast in both of the reflective display and transmissive display.

In the liquid crystal display device of the vertical alignment mode, preferably, a configuration in which one dot region is divided into a plurality of sub-dot regions and the pixel electrode has a plurality of island-shaped portions constituting these sub-dot regions and connection portions for connecting among adjacent island-shaped portions (for example, this configuration resembles dumplings on a skewer) has been employed recently. As such, by dividing one pixel electrode into the plurality of island-shaped portions, the shape of each island-shaped portion can be made to be close to a circular shape or a regular polygon, and a more uniform alignment division structure having a wide viewing angle over all directions of 360° can be implemented, thereby realizing a liquid crystal display device having excellent visibility for all directions.

When the above-mentioned configuration is employed for the invention, preferably, at least an edge of each of the island-shaped portions and a region overlapping the connection portions in plan view additionally become the reflective display region.

With this configuration, a region in which the liquid crystal molecules fall down halfway is generated at the edges of all island-shaped portions, as in the edge of the pixel electrode. Further, since the connection portions are regions in which the liquid crystal molecules tend to fall down in various directions, a region in which most of the liquid crystal molecules do not fall down or a region in which the liquid crystal molecules fall down halfway is generated. Accordingly, by additionally setting these regions as the reflective display region, the retardation in the reflective display region can be smaller than that in the transmissive display region even in those set regions, thereby improving contrast in both of the reflective display and transmissive display.

Further, in the invention, preferably, an alignment controller that controls an alignment direction of the liquid crystal layer is further provided in a region of the counter substrate which overlaps each of island-shaped portions in plan view.

As described above, since an electric field applied to the liquid crystal layer at an edge of each island-shaped portion in an inclined direction can drop the liquid crystal molecules down in a radial direction, it is possible to control the alignment direction. However, since this electric field does not necessarily provide a sufficient alignment control, the alignment control can be further intensified by forming the alignment controller at a position on the counter substrate corresponding to the middle region of the island-shaped portions, for example. As a result, an alignment division structure can be reliably implemented, thereby obtaining the wide viewing angle.

In this case, preferably, at least a region overlapping the alignment controller in plan view additionally becomes the reflective display region.

With this configuration, as described above, the retardation in the reflective display region can be smaller than the retardation in the transmissive display region even in regions overlapping the alignment controller in plan view, thereby improving contrast in both of the reflective display and transmissive display.

Furthermore, in the invention, preferably, a circularly-polarized light incidence unit that allows approximately circularly-polarized light to be incident on each of the pair of substrates is further provided. This configuration also provides good contrast in both of the reflective display and transmissive display.

According to another aspect of the invention, an electronic apparatus includes the liquid crystal display device of the invention.

With this configuration, it is possible to provide an electronic apparatus including a liquid crystal display device having high brightness, high contrast and a wide viewing angle regardless of the use environment.

BRIEF DESCRIPTION OF THE DRAWINGS

The invention will be described with reference to the accompanying drawings, wherein like numbers reference like elements, and wherein.

DESCRIPTION OF THE EMBODIMENTS

First Embodiment

Hereinafter, a first embodiment of the invention will be described with reference to FIGS. 1 to 3.

A liquid crystal display device according to this embodiment is an example of an active-matrix-type liquid crystal display device using a thin film transistor (TFT) as a switching element.

Figure 1:
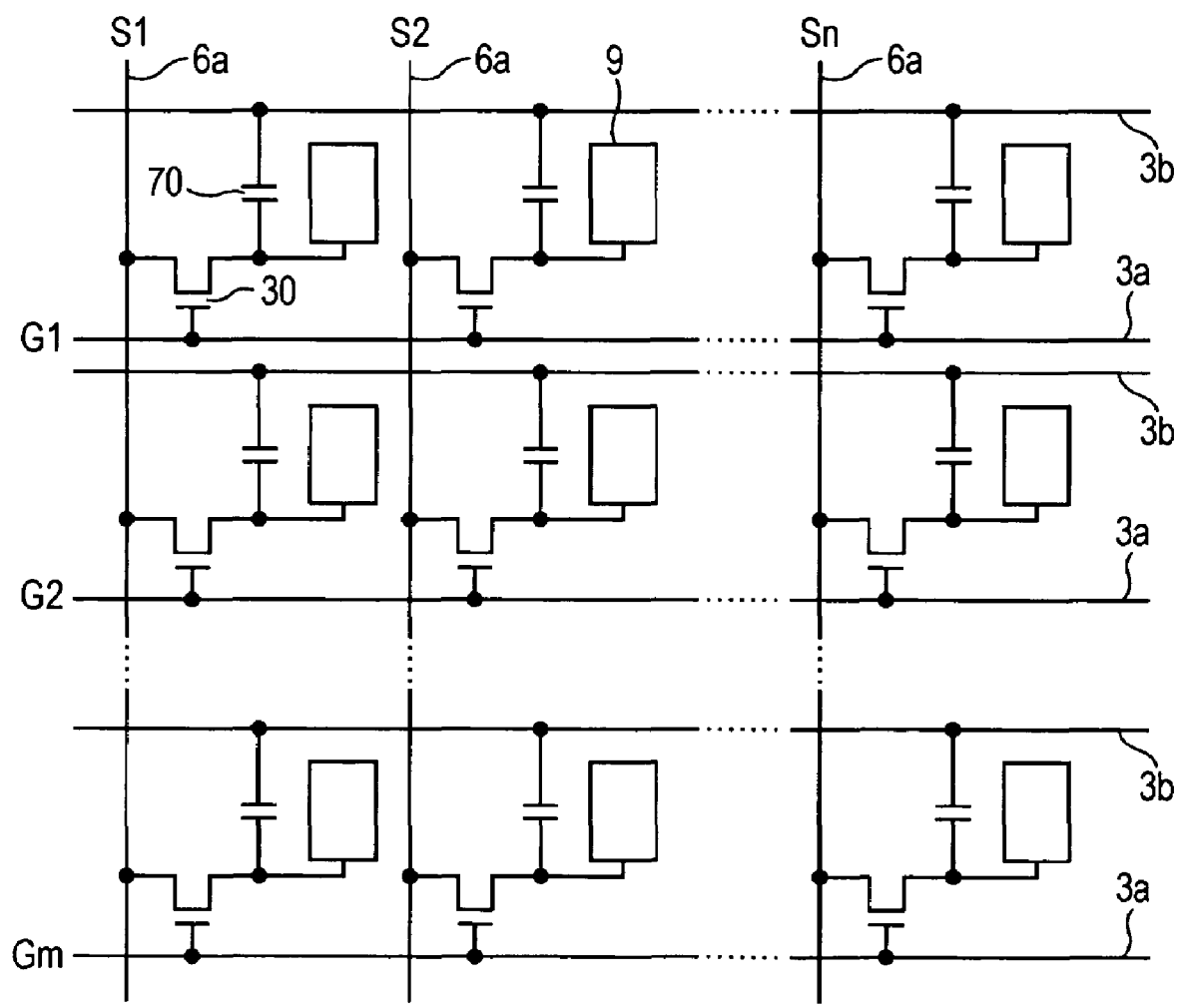
FIG. 1 is an equivalent circuit diagram showing a liquid crystal display device according to a first embodiment of the invention.
Figure 2:
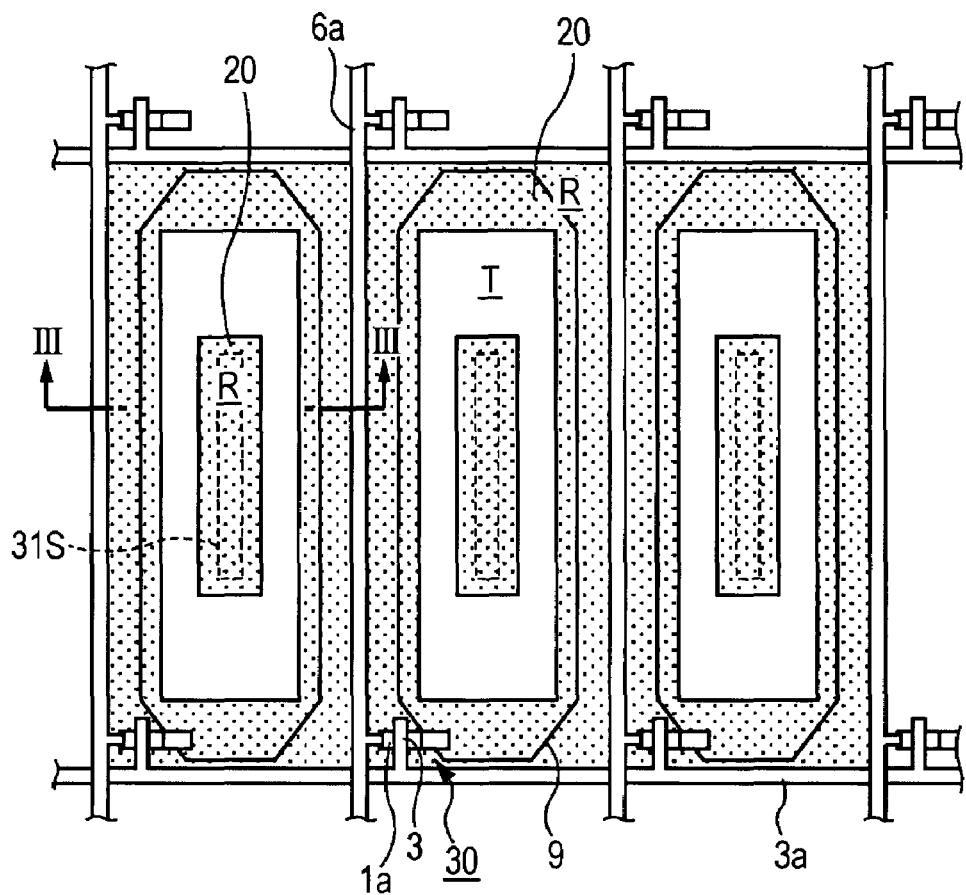
FIG. 2 is a plan view showing configuration of one dot of the liquid crystal display device according to the first embodiment.
Figure 3:
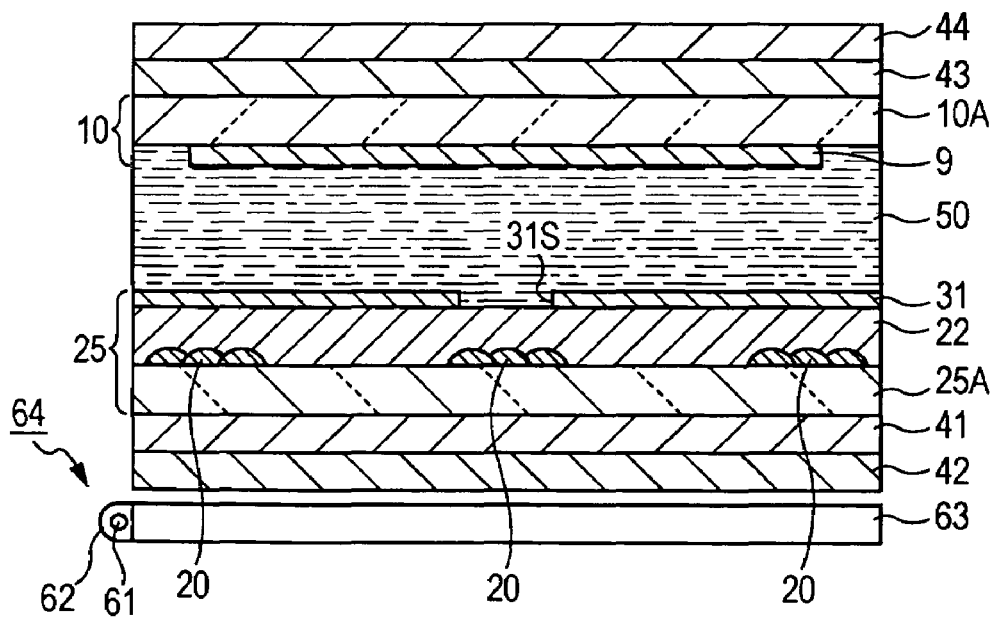
FIG. 3 is a cross-sectional view taken along line III-III in the liquid crystal display device shown in FIG. 2.
Figure 4:
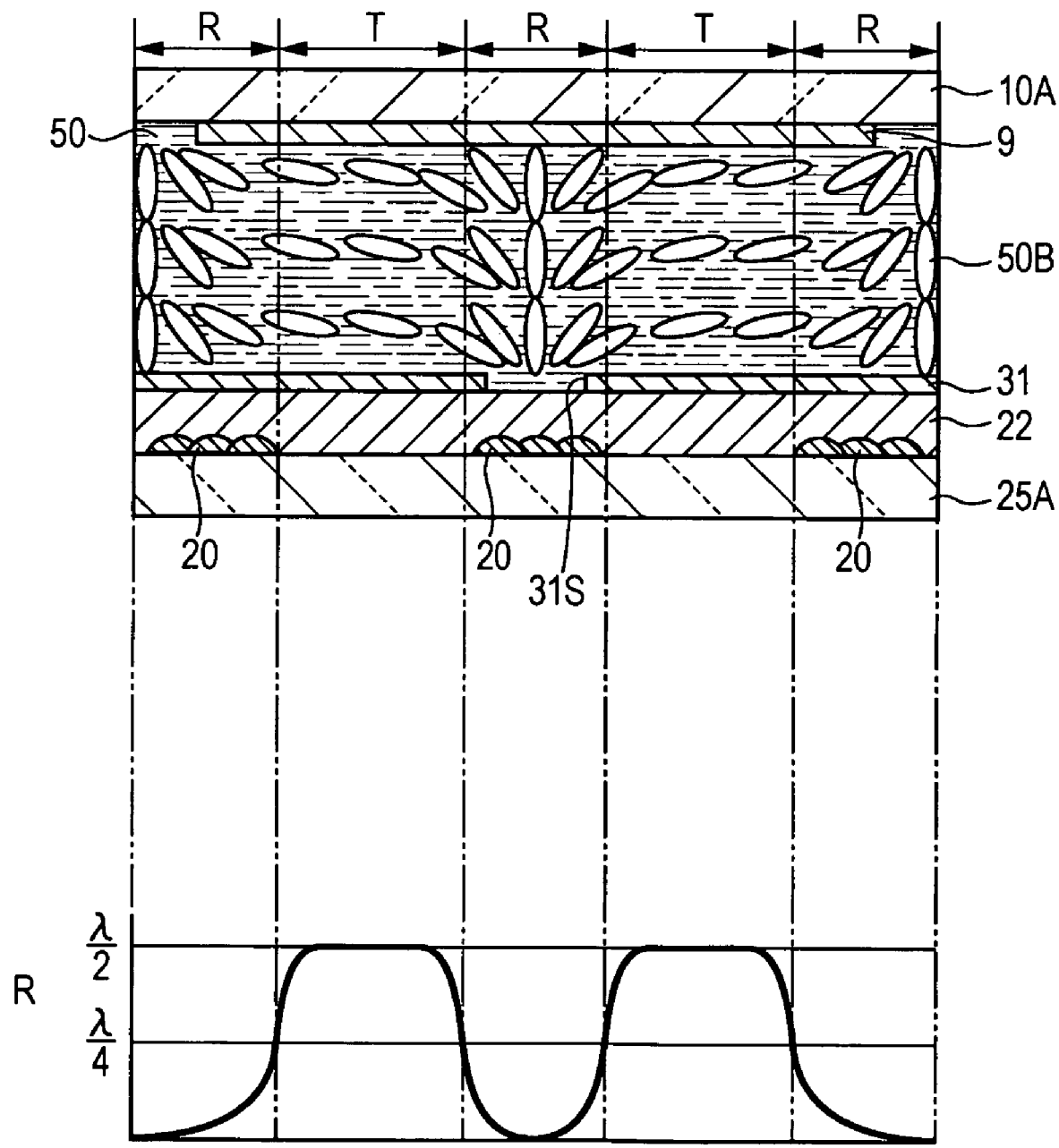
FIG. 4 is a view showing an alignment state of liquid crystal in the liquid crystal display device shown in FIG. 2 when a selective voltage is applied.

FIG. 1 is an equivalent circuit diagram showing a plurality of dots, which are arranged in a matrix, constituting an image display region of the liquid crystal display device according to the embodiment, FIG. 2 is a plan view showing a structure within a dot region of a TFT array substrate, FIG. 3 is a cross-sectional view, which is taken along line III-III of FIG. 2, showing a structure of the liquid crystal display device, and FIG. 4 is a view showing an alignment state of liquid crystal molecules. Throughout the drawings, the scale of each layer of member is adjusted in order to have a recognizable size in the drawings.

As shown in FIG. 1, for the liquid crystal display device according to this embodiment, pixel electrodes 9 and TFTs 30 serving as switching elements for controlling the respective pixel electrodes 9 are respectively formed in the plurality of dots, which are arranged in a matrix, constituting the image display region, and data lines 6a to which image signals are supplied are electrically connected to source electrodes of the TFTs 30, respectively. The image signals S1, S2, . . . , Sn are input to the respective data lines 6a in a line-sequential manner or are input to respective groups of the data lines 6a, each group including a plurality of adjacent data lines 6a. Further, a plurality of scanning lines 3a are electrically connected to gate electrodes of the TFTs 30, respectively, and scanning signals G1, G2, . . . , Gm are applied, in a line-sequential manner, to respective scanning lines 31 in a pulse form at a predetermined timing. In addition, the pixel electrodes 9 are connected to drain electrodes of the TFTs 30, respectively, and the image signals S1, S2, . . . , Sn supplied from the data lines 6a are input at a predetermined timing by turning on the TFTs 30 serving as the switching elements only for a predetermined period of time.

The image signals S1, S2, . . . , Sn, each having a predetermined level, written into the liquid crystal by the pixel electrodes 9, are held between the pixel electrodes 9 and common electrodes to be described later, respectively, for a predetermined period of time. In the liquid crystal, the alignment or the order of a set of molecules changes according to the level of the voltage applied to the liquid crystal, thereby being able to modulate light and to display a gray scale. In this case, in order to prevent the held image signals from leaking, storage capacitors 70 are added in parallel to the liquid crystal capacitance formed between the pixel electrodes 9 and the common electrodes. In addition, reference numeral 3b denotes capacitive lines.

Next, a planar structure of a TFT array substrate constituting the liquid crystal display device according to the embodiment will be described with reference to FIG. 2.

As shown in FIG. 2, a plurality of approximately rectangular (exactly speaking, octagonal) pixel electrodes 9 are arranged on a TFT array substrate 10 in a matrix, and the data lines 6a, the scanning lines 3a and the capacitive lines (not shown in FIG. 2) are arranged along respective vertical and horizontal boundaries of the pixel electrodes 9. The TFTs 30 to drive the respective pixel electrodes 9 are formed at the lower left portions of the respective pixel electrodes 9. In this embodiment, an inner side of a region in which an individual pixel electrode 9, the data lines 6a and scanning lines 3a surrounding the pixel electrode 9, and a corresponding TFT 30 are formed defines each dot region. Also, the embodiment has a structure in which images can be displayed for each of dot regions arranged in a matrix.

The data lines 6a are electrically connected to source regions of a semiconductor layer 1a constituting the TFTs 30, each semiconductor layer 1a being composed of, for example, a polysilicon film, and the pixel electrodes 9 are electrically connected to drain regions of the semiconductor layer 1a. Further, portions branched toward the inside of the dot regions from the scanning lines 3a function as gate electrodes 3 each of which is opposite to a channel region of the semiconductor layer 1a.

As shown in FIG. 2, in each dot. region, a reflection film 20 having a rectangular frame shape is formed at an outer region of the pixel electrode 9 and at an edge of the pixel electrode 9. Further, at a position corresponding to a central portion of the. pixel electrode 9, a rectangular opening 31S (alignment controller, surrounded by a dotted line) is formed in a common electrode 31 on a counter substrate 25, which will be described later. A rectangular reflection film 20, having a larger outline than that of the opening 31S, is formed to surround the opening 31S. A region including the reflection film 20 becomes the reflective display region R, and a rectangular loop-shaped region in which the reflection film 20 is not formed becomes a transmissive display region T.

Next, a cross-sectional structure of the liquid crystal display device according to this embodiment will be described with reference to FIG. 3. FIG. 3 is a cross-sectional view taken along line III-III of FIG. 2. Since the invention is characterized by the configuration of the reflection films or the electrodes or is characterized by the positional relationship between the reflection films and the electrodes and has the same cross-sectional structure of TFTs or other wiring lines, as in the related art, illustration and explanation of TFTs or other wiring lines will be omitted herein for the sake of simplicity.

As shown in FIG. 3, a liquid crystal layer 50 composed of liquid crystal having negative dielectric anisotropy, which indicates that an initial alignment state thereof is vertical, is interposed between the TFT array substrate 10 (element substrate) and the counter substrate opposite to the TFT array substrate 10. In this embodiment, an upper (viewing side) substrate is the TFT array substrate 10 and a lower (back side) substrate is the counter substrate 25. In the TFT array substrate 10, the pixel electrodes 9 formed by using a transparent conductive film made of an indium tin oxide (ITO) or the like are formed on a substrate body 10A made of a transparent material such as quartz, glass, or the like. In addition, a vertical alignment film (not shown) is formed on a top surface of the TFT array substrate 10 above the pixel electrode 9.

On the other hand, in the counter substrate 25, the reflection film 20, which is a metal film made of aluminum, silver or the like having high reflectivity, is formed on a substrate body 25A composed of a transparent material such as glass, quartz, or the like. Unevenness which reflects the surface shape of a base insulating layer (not shown) made of, for example, an acryl resin is formed on a surface of the reflection film 20. Reflected light is scattered by this unevenness, thereby improving the quality in the reflective display. As described above, the reflection film 20 is formed over the region ranging from the outer side to the edge of the pixel electrode 9 and the region ranging from the inner side to the outer side of the opening 31S of the common electrode 31. The region in which the reflection film 20 is formed becomes the reflective display region R and the region in which the reflection film 20 is not formed becomes the transmissive display region T.

A pigment layer 22 of a color filter is formed on the reflection film 20 positioned in the reflective display region R and the substrate body 25A positioned in the transmissive display region T. Red (R), green (G), and blue (B) pigment layers 22 are arranged in three adjacent dot regions, respectively, and the three adjacent dot regions constitute one pixel. Alternatively, in order to compensate for a color saturation difference between the reflective display and the transmissive display, pigment layers with modified color purity or film thickness may be separately formed in the reflective display region R and the transmissive display region T. In addition, a planarization film made of resin or the like may be formed on the pigment layer 22.

The common electrode 31 formed by using a transparent conductive film made of ITO or the like is formed on the pigment layer 22 of the color filter. As described above, in the common electrode 31, the rectangular opening 31S is formed at the position corresponding to the central portion of the pixel electrode 9. The vertical alignment film (not shown) is formed on the common electrode 31. In this embodiment, although both alignment films located at the TFT array substrate 10 and the counter substrate 25 sides are subject to a vertical alignment process, a process of providing a pre-tilt angle to the liquid crystal molecules, such as a rubbing process or the like, is not performed. Alternatively, the pre-tilt angle may be provided to the liquid crystal molecules.

Further, a retardation film 43 and a polarizer 44 are provided at the substrate body side of the TFT array substrate 10 and a retardation film 41 and a polarizer 42 are provided at the substrate body side of the counter substrate 25. The retardation films 43 and 41 each have a phase difference of about ¼λ with respect to the wavelength of visible light, and combinations of the retardation films 43 and 41 and polarizers 44 and 42 allow approximately circularly-polarized light to be incident on the liquid crystal layer 50 from both sides of the TFT array substrate 10 and the counter substrate 25. In addition, transmission axes of the two polarizers 44 and 42 are vertically arranged (i.e., in a cross Nicol manner) in plan view. A backlight 64 including a light source 61, a reflector 62, a light guide plate 63 and the. like is provided at the outer side of the liquid crystal cell corresponding to the outside of the counter substrate 25.

For the liquid crystal display device according to the embodiment, FIG. 4 shows an alignment state of liquid crystal molecules in the liquid crystal display device, when a selective voltage is applied.

Liquid crystal molecules 50B change from a vertical alignment state to a horizontal alignment state by applying a selective voltage. In this case, all of the liquid crystal molecules are not uniformly horizontally-aligned in a dot region, but the horizontal alignment of the liquid crystal molecules continuously change in a dot region, as shown in FIG. 4. That is, in a region in which the pixel electrode 9 is completely opposite to the common electrode 31, since the electric field is applied in a normal line direction of the substrate surface, the liquid crystal molecules 50B fall down in a nearly horizontal direction. On the other hand, in a region located in the outer side of the pixel electrode 9, that is, in a region deviating from the pixel electrode 9, since no electric field is applied to the liquid crystal layer 50, the liquid crystal molecules 50B maintain the vertical alignment. In addition, in an intermediate region located in the vicinity of an edge of the pixel electrode 9, since the electric field is applied to the liquid crystal layer 50 in a direction inclined from the normal line direction of the substrate surface, the liquid crystal molecules 50B fall down halfway, like a petal opening downward. Similarly, in a region corresponding to the center of the opening 31S of the common electrode 31, the liquid crystal molecules 50B maintain the vertical alignment, but, in the vicinity of an edge of the opening 31S, the liquid crystal molecules 50B fall down halfway, like a petal opening upward.

That is, considering the retardation in the alignment state shown in FIG. 4, the retardation has a predetermined value in a middle portion of the pixel electrode 9 in which the liquid crystal molecules 50B are approximately horizontally aligned, but the retardation is zero in the center between adjacent pixel electrodes 9 in which the liquid crystal molecules 50B are approximately horizontally aligned and in the center of the opening 31S of the common electrode 31 in which the liquid crystal molecules 50B are approximately horizontally aligned. Further, the retardation continues to be small from the middle portion of the pixel electrode 9 to the center between adjacent pixel electrodes 9 and from the middle portion of the pixel electrode 9 to the center of the opening 31S of the common electrode 31. In this embodiment, the middle portion of the pixel electrode 9 corresponds to the transmissive display region T and a portion between adjacent pixel electrodes 9 and the opening 31S of the common electrode 31 corresponds to the reflective display region R.

Here, by setting the anisotropy of refractive index $\Delta n$ and the thickness d of the liquid crystal layer to a proper value, the retardation value ($R=\Delta n \cdot d$) in the transmissive display region T in the alignment state as shown in FIG. 4 can become ½ of the wavelength of visible light (for example, assuming that the wavelength of green light is $\lambda$, $\lambda/2=270$ to 280 nm). Then, as shown in the lower side of the FIG. 4, the retardation R in the reflective display region R decreases from $\lambda/2$, through 80 /4, to zero. In this embodiment, it is preferable that the reflection film 20 be formed in a region where the retardation value R is less than $\lambda/4$ (130 to 140 nm), and this region become the reflective display region R. This is because even a region having a retardation R smaller than that of the transmissive display region T may contain color of reflective display, if a region having a retardation value between $\lambda/2$ and $\lambda/4$ is used as the reflective display region R, thereby deteriorating display quality. It does not matter that this region is used as the transmissive display region T.

As described above, in the liquid crystal display device according to the embodiment, by dividing regions having different alignment states of the liquid crystal layer 50 into the reflective display region R and the transmissive display region T, the retardation in the reflective display region R can become smaller than the retardation in the transmissive display region T without employing a multi-gap structure, thereby improving contrast in both of the reflective display and the transmissive display. With such a configuration, since an adverse effect caused by a resin layer in the multi-gap structure can be eliminated, a liquid crystal display device having high contrast can be achieved. In addition, since an alignment division structure in which an alignment direction of liquid crystal within one dot region is approximately radially divided by the shape of the pixel electrode 9 and an operation of the opening 31S of the common electrode 31 can be attained, image display with a wide viewing angle can be realized.

Second Embodiment

Hereinafter, a second embodiment of the invention will be described with reference to FIGS. 5 and 6.

Figure 5:
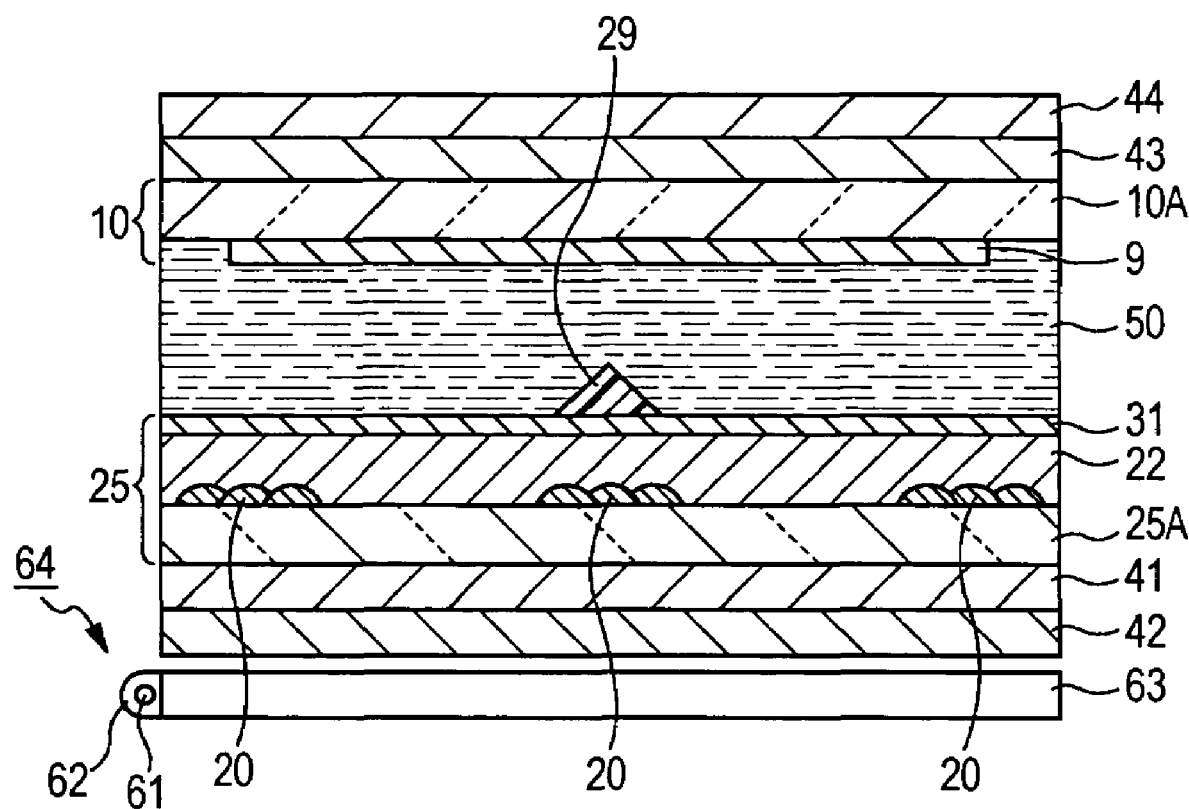
FIG. 5 is a cross-sectional view. of a liquid crystal display device according to a second embodiment of the invention.
Figure 6:
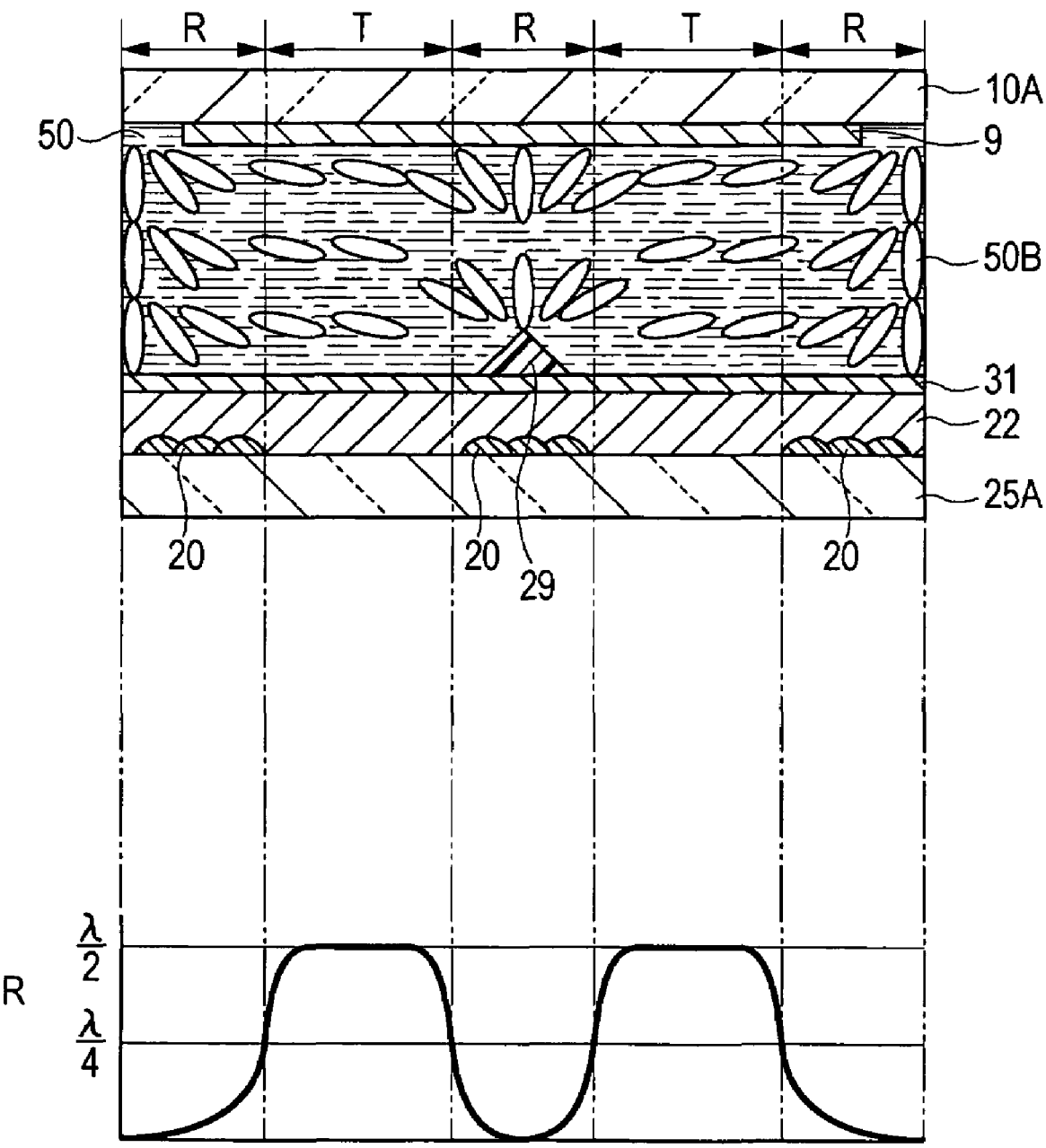
FIG. 6 is a view showing an alignment state of liquid crystal in the liquid crystal display device shown in FIG. 5 when a selective voltage is applied.

FIG. 5 is a cross-sectional view of a liquid crystal display device according to a second embodiment of the invention, and FIG. 6 is a view showing an alignment state of liquid crystal. The liquid crystal display device according to the embodiment has the same basic configuration as the first embodiment. Therefore, in FIGS. 5 and 6, the same elements as in FIGS. 3 and 4 are denoted by the same reference numerals and detailed explanation thereof will be omitted for the sake of simplicity.

In this embodiment, a convex portion 29 (alignment controller) having a triangular cross section is formed on the common electrode 31 located at the counter substrate 25 side, as shown in FIG. 5, instead of the opening 31S of the common electrode 31. The convex portion 29 is made of a dielectric material such as an acryl resin or the like and has a planar shape linearly formed in the center of the dot region, like the shape of the opening 31S of the first embodiment shown in FIG. 2. In addition, in the counter substrate 25, a vertical alignment film (not shown) is formed to cover the common electrodes 31 and the convex portions 29. That is, the liquid crystal display device of the second embodiment is different from that of the first embodiment only in that the convex portions 29 are used as the alignment controllers.

As shown in FIG. 6, the alignment state of liquid crystal when the selective voltage is applied is also equal to the alignment state of liquid crystal in the first embodiment shown in FIG. 4. As described above, when the opening is provided in the common electrode 31, the liquid crystal molecules obliquely fall down at the edge of the opening by applying the electric field to the liquid crystal in a direction inclined with respect to the normal line direction of the substrate. On the other hand, when the convex portion 29 is provided on the common electrode 31, the liquid crystal molecules 50B tend to be aligned vertically with respect to an inclined plane due to a shape effect of the convex portion 29, and as a result, the liquid crystal molecules 50B obliquely fall down. When the convex portions 29 are provided in this way, although a liquid crystal alignment mechanism is different from that when the openings are provided, the alignment state in both cases are equal to each other in that the liquid crystal molecules fall down, like a petal opening upward. In addition, the variation in the retardation shown in the lower portion of FIG. 6 is also equal to that in the first embodiment.

In the liquid crystal display device of the second embodiment, it is also possible to obtain the same effect as in the first embodiment in which an alignment division structure within the dot region, in which the retardation in the reflective display region R and the transmissive display region T can be optimized without employing the multi-gap structure nor does any deterioration of contrast due to the resin layer in the multi-gap structure occur to thereby improve contrast in both of the reflective display and the transmissive display, can be achieved, and accordingly, image display with a wide viewing angle can be realized.

Third Embodiment

Hereinafter, a third embodiment of the invention will be described with reference to FIGS. 7 to 9.

Figure 7:
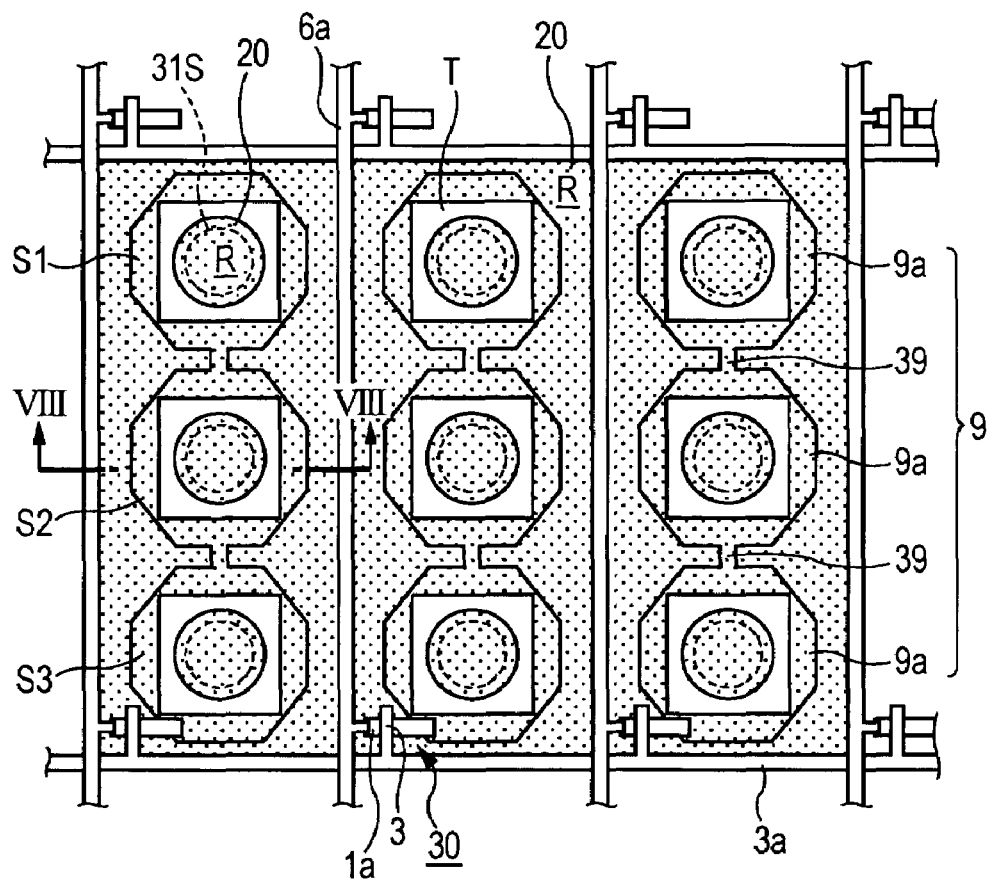
FIG. 7 is a plan view showing configuration of dots of a liquid crystal display device according to a third embodiment of the invention.
Figure 8:
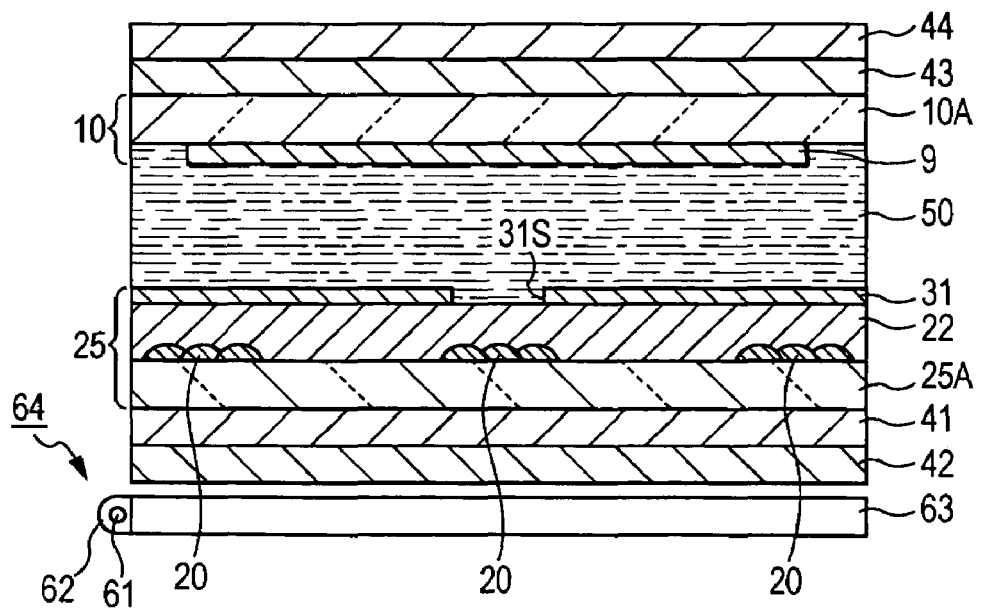
FIG. 8 is a cross-sectional view taken along line VIII-VIII in the liquid crystal display device shown in FIG. 7.
Figure 9:
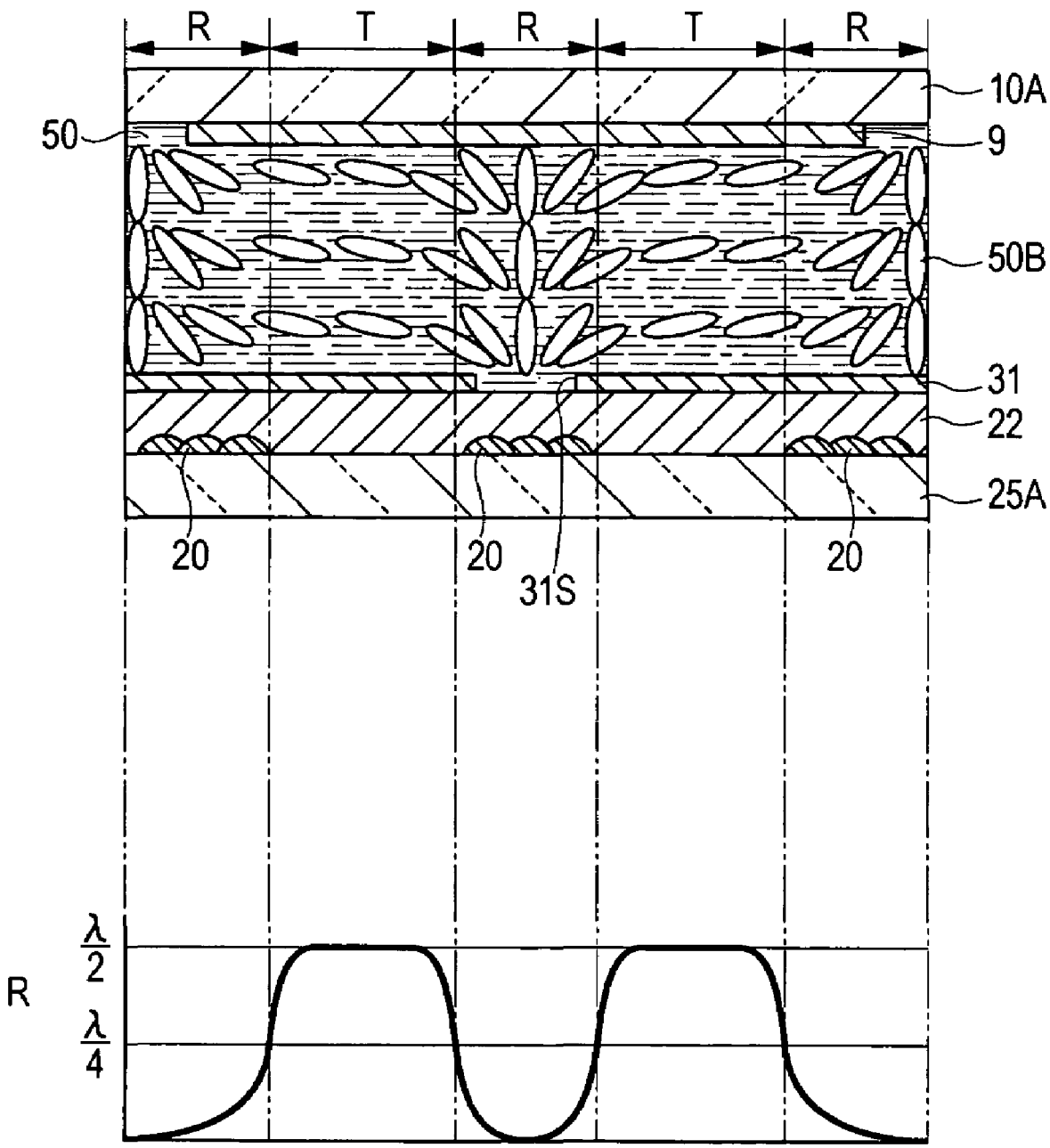
FIG. 9 is a view showing an alignment state of liquid crystal in the liquid crystal display device shown in FIG. 7 when a selective voltage is applied.

FIG. 7 is a plan view showing configuration of dot regions of a liquid crystal display device according to the embodiment, FIG. 8 is a cross-sectional view taken along line VIII-VIII of FIG. 7, showing the configuration of the liquid crystal display device of the third embodiment, and FIG. 9 is a view showing an alignment state of liquid crystal when a selective voltage is applied. The liquid crystal display device according to the embodiment has the same basic configuration as the first embodiment. Therefore, in FIGS. 7 to 9, the same elements as in FIGS. 2 to 4 are denoted by the same reference numerals and detailed explanation thereof will be omitted for the sake of simplicity.

In the third embodiment, as shown in FIG. 7, the pixel electrode 9 is configured to include three island-shaped portions 9a, 9b, and 9c. The three island-shaped portions 9a, 9b, and 9c are electrically connected to one another with connection portions 39 interposed therebetween, thereby forming one pixel electrode 9. That is, in the third embodiment, each dot region is configured to be divided into three sub-dot regions S1, S2, and S3 having approximately the same shapes. Specifically, each of the pixel electrodes 9 at the TFT array substrate 10 side is configured to include the three island-shaped portions 9a, 9b, and 9c and the two connection portions 39 and 39 to electrically connect among the island-shaped portions 9a, 9b, and 9c, and the island-shaped portion 9a, 9b, and 9c constitute the sub-dot regions S1, S2, and S3, respectively.

Typically, since an aspect ratio of one dot region in a liquid crystal display device having color filters is about 3:1, when three sub-dot regions S1, S2, and S3 are provided in one dot region as in the third embodiment, it is possible to make the shape of one sub-dot region close to a circular shape or a regular polygon and it is preferable to obtain a wide viewing angle over all directions of 360°. The shape of each sub-dot region S1, S2, and S3 (each island-shaped portion 9a, 9b, and 9c) is octagonal in FIG. 7. However, the invention is not limited thereto. For example, a circular shape or other polygons may be employed. Further, in the pixel electrode 9, slits (portions except the connection portions 39) having a shape formed by partially notching the electrode 9, are formed among the island-shaped portions 9a, 9b, and 9c.

Further, at a position corresponding to a central portion of each island-shaped portion 9a, 9b, and 9c, a circular opening 31S (alignment controller, surrounded by a dotted line) is formed in the common electrode 31 on the counter substrate 25. In each dot region, reflection films 20 having rectangular frame shapes are formed at a region outside each island-shaped portion 9a, 9b, and 9c, an edge of each island-shaped portion 9a, 9b, and 9c, and a region overlapping the connection portion 39 in plan view. In addition, a circular reflection film 20, having a larger outline than that of the opening 31S, is formed to surround the opening 31S of the common electrode 31. A region including these reflection films 20 becomes the reflective display regions R and a rectangular loop-shaped region in which the reflection film 20 is not formed becomes the transmissive display region T, respectively.

As shown in FIG. 8, the liquid crystal display device of the third embodiment has the same cross-sectional structure as that of the first embodiment shown in FIG. 3. Also, the alignment state of the liquid crystal shown in FIG. 9 is the same as that in the first embodiment. In addition, although not shown in the figure, in a cross section obtained by cutting a straight line passing through the connection portion 39, since an alignment state in a region immediately below the connection portion 39 is equal to an alignment state in a region immediately above the opening at a central portion of FIG. 9, the liquid crystal molecules 50B fall down, like a petal opening upward.

The liquid crystal display device of the third embodiment can also obtain the same effect as in the first and second embodiments in which the retardation in the reflective display region R and the transmissive display region T can be optimized without employing the multi-gap structure nor does any deterioration of contrast due to the resin layer in the multi-gap structure occur, thereby improving contrast in both of the reflective display and the transmissive display. Further, in the third embodiment, the wide viewing angle substantially over all directions can be attained by dividing one dot region into a plurality of sub-dot regions S1, S2, and S3.

Fourth Embodiment

Hereinafter, a fourth embodiment of the invention will be described with reference to FIGS. 10 and 11.

Figure 10:
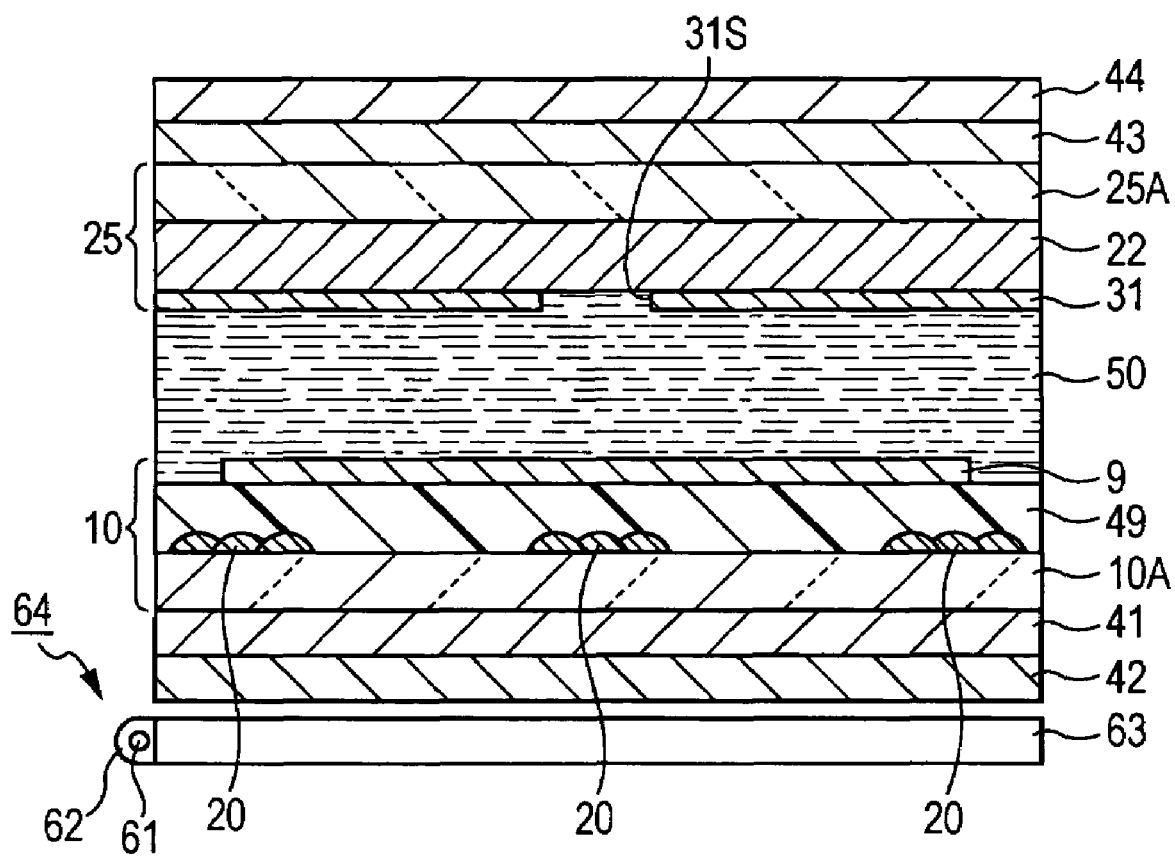
FIG. 10 is a cross-sectional view of a liquid crystal display device according to a fourth embodiment of the invention.
Figure 11:
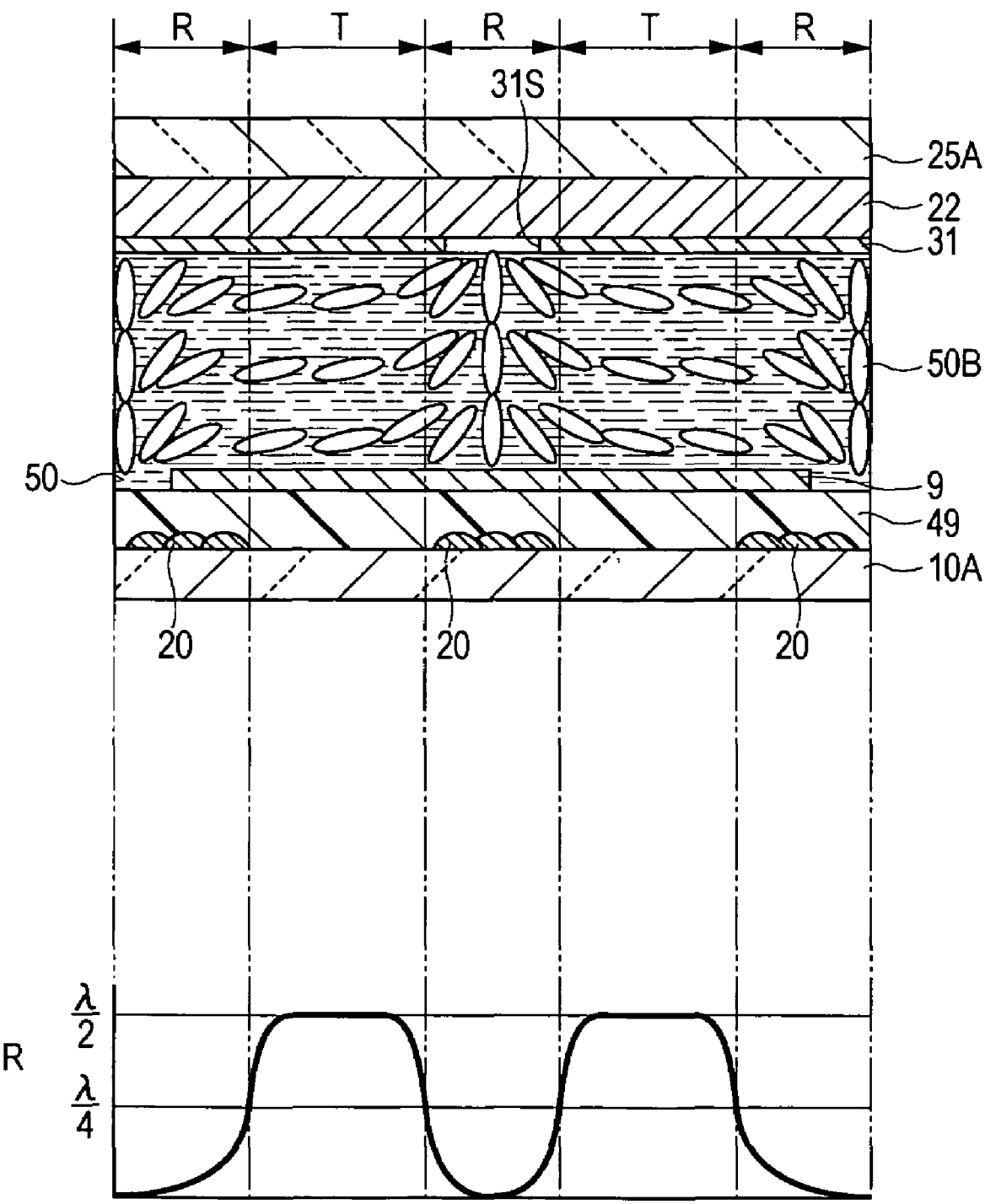
FIG. 11 is a view showing an alignment state of liquid crystal in the liquid crystal display device shown in FIG. 10 when a selective voltage is applied.

FIG. 10 is a cross-sectional view of a liquid crystal display device according to the fourth embodiment of the invention, and FIG. 11 is a view showing an alignment state of liquid crystal when a selective voltage is applied. In the liquid crystal display device of the fourth embodiment, one dot region is divided into a plurality of sub-dot regions. The liquid crystal display device of the fourth embodiment has the same planar structure as that of third embodiment, and therefore, explanation thereof will be omitted for the sake of simplicity and different portions in a cross-sectional structure will be described.

While the TFT array substrate 10 is provided at the viewing side and the counter substrate 25 is provided at the backlight 64 side in the first to third embodiments, the counter substrate 25 having color filters is provided at the viewing side and the TFT array substrate 10 is provided at the backlight 64 side in the fourth embodiment.

That is, as shown in FIG. 10, in the TFT array substrate 25 (a lower substrate), the reflection film 20, which is a metal film made of aluminum, silver or the like having high reflectivity, is formed on a substrate body 10A made of a transparent material such as glass, quartz, or the like. On a surface of the reflection film 20 is formed unevenness which reflects a surface shape of a base insulating layer (not shown) made of, for example, an acryl resin. Reflected light is scattered by the unevenness, thereby improving the quality in the reflective display. The reflection film 20 is formed over a region ranging from the outer side to the edge of the pixel electrode 9, which will be described later, and a region ranging from the inner side to the outer side of the opening 31S of the common electrode 31. The region in which the reflection film 20 is formed becomes the reflective display region R and the region in which the reflection film 20 is not formed becomes the transmissive display region T. A planarization film 49 made of an acryl resin or the like is formed on the entire surface of the substrate body 10A including the reflection film 20, and the pixel electrodes 9 formed by using a transparent conductive film made of ITO or the like are formed on the planarization film 49. A vertical alignment film (not shown) is formed on the pixel electrode 9.

On the other hand, in the counter substrate 25 (an upper substrate), the pigment layer 22 constituting a color filter is formed on the inner side of the substrate body 25A, which is made of a transparent material such as quartz, glass or the like. Red (R), green (G), and blue (B) pigment layers 22 are arranged in three adjacent dot regions, respectively, and the three adjacent dot regions constitutes one pixel. Alternatively, in order to compensate for a color saturation difference between the reflective display and the transmissive display, pigment layers with modified color purity or film thickness may be separately formed in the reflective display region R and the transmissive display region T. Moreover, a planarization film made of resin or the like may be formed on the pigment layer 22. The common electrode 31 formed by using a transparent conductive film made of ITO or the like is formed on the pigment layer 22 of the color filter. In the common electrode 31, the opening 31S (alignment controller) is formed at the position corresponding to the central portion of the island-shaped portions 9a, 9b, and 9c of the pixel electrode 9. The vertical alignment film (not shown) is formed on the common electrode 31. In addition, the retardation films 41 and 43, the polarizers 42 and 44, and the backlight 64, all of which are located at the outer side of each substrate, have the same configuration as those of the first to third embodiments.

As shown in FIG. 11, the alignment state of the liquid crystal when a selective voltage is applied in the fourth embodiment is upside-down with respect to those in the first to third embodiments. That is, since the pixel electrodes 9 are arranged at the lower substrate side and the openings 31S of the common electrodes 31 are arranged at the upper substrate side in the fourth embodiment, the alignment state of the liquid crystal when a selective voltage is applied in the fourth embodiment is upside-down with respect to those in the first to third embodiments. Accordingly, the direction in which the electric field is obliquely inclined in an edge of the pixel electrode 9 or the opening 31S is opposite to those in the first to third embodiments, and the liquid crystal molecules 50B fall down in the edge of the pixel electrode 9, like a petal opening upward, while falling down in the edge of the opening 31S, like a petal opening downward. However, the variation in the retardation shown in the lower portion of FIG. 11 is equal to those in the first to third embodiments.

In the liquid crystal display device of the fourth embodiment, it is also possible to obtain the same effect as in the third embodiment in which the retardation in the reflective display region R and the transmissive display region T can be optimized without employing the multi-gap structure nor does any deterioration of contrast due to the resin layer in the multi-gap structure occur, thereby improving contrast in both of the reflective display and the transmissive display, and, in addition, the wide viewing angle substantially over all directions can be attained by dividing one dot region into a plurality of sub-dot regions.

Electronic Apparatus

Next, an electronic apparatus including the liquid crystal display device of the above-mentioned embodiments of the invention will be described by way of an example.

Figure 12:
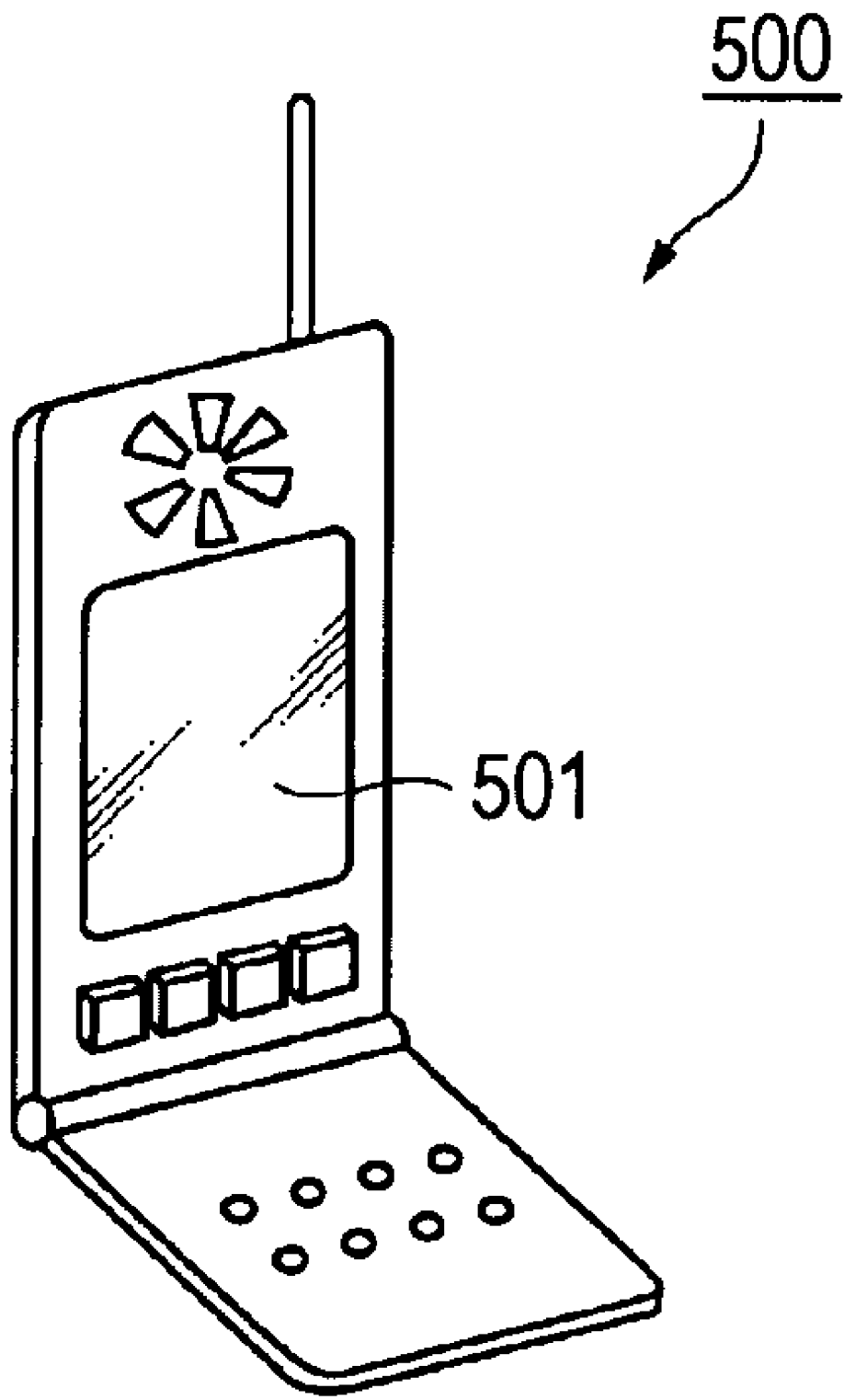
FIG. 12 is a perspective view illustrating an example of an electronic apparatus according to the invention.

FIG. 12 is a perspective view illustrating an example of a mobile phone. In FIG. 12, reference numeral 500 denotes a body of the mobile phone and reference numeral 501 denotes a display unit using the liquid crystal display device.

Since the electronic apparatus shown in FIG. 12 includes the display unit using the liquid crystal display device of the above embodiments, it is possible to realize an electronic apparatus with a liquid crystal display device having high brightness, high contrast and a wide viewing angle regardless of the use environment.

The technical scope of the invention is not limited to the above embodiments but may be modified in various ways without deviating from the spirit of the invention. For example, although the invention is applied to the active-matrix-type liquid crystal display device using TFTs as switching elements in the above embodiments, the invention may be applied to an active-matrix-type liquid crystal display device using thin film diodes (TFD) as switching elements. Furthermore, material, dimension, shape and the like of various constituent elements may be appropriately modified as needed.

What is claimed is:

1. A liquid crystal display device comprising:
    a pair of substrates including an element substrate and a counter substrate;
    a liquid crystal layer interposed between the pair of substrates, the liquid crystal layer comprising liquid crystal having negative dielectric anisotropy;
    a common electrode provided on the counter substrate;
    a dot region including a transmissive display region for transmissive display and a reflective display region for reflective display, the thickness of the liquid crystal layer in the reflective display region being approximately equal to that of the liquid crystal layer in the transmissive display region;
    a light-transmissive pixel electrode provided on the element substrate for applying voltage to drive the liquid crystal layer in cooperation with the common electrode, the pixel electrode including an outer edge and being in a non-overlapping condition with the common electrode at a region within the dot; and
    a reflector that is located in the reflective display region and that does not contribute to the application of voltage to the liquid crystal layer, the reflector overlapping the outer edge of the pixel electrode and overlapping the region within the dot where the pixel electrode is in a non-overlapping condition with the common electrode.

2. The liquid crystal display device according to claim 1, further comprising an alignment controller that controls an alignment direction of the liquid crystal layer, the alignment controller being provided in a region of the counter substrate which overlaps the pixel electrode in plan view.

3. The liquid crystal display device according to claim 2, wherein the reflective display region is further located at a region overlapping the alignment controller.

4. The liquid crystal display device according to claim 1, wherein the pixel electrode includes a plurality of island-shaped portions, each constituting a sub-dot region in the dot region, and connection portions for connecting among the plurality of island-shaped portions, and
    wherein at least an edge of each of the island-shaped portions and a region overlapping the connection portions in plan view additionally become the reflective display region.

5. The liquid crystal display device according to claim 4, further comprising an alignment controller that controls an alignment direction of the liquid crystal layer, the alignment controller being provided in a region of the counter substrate that overlaps the island-shaped portions in plan view.

6. The liquid crystal display device according to claim 5, wherein the reflective display region is further located at a region overlapping the alignment controller in plan view.

7. The liquid crystal display device according to claim 1, further comprising a circularly-polarized light incidence unit that allows approximately circularly-polarized light to be incident on each of the pair of substrates.

8. An electronic apparatus comprising the liquid crystal display device according to claim 1.

9. The liquid crystal display device according to claim 1, wherein the reflector overlaps a region where the common electrode and pixel voltage do not apply voltage to the liquid crystal and overlaps a region where the common electrode and pixel voltage apply an electric field that is inclined from a normal line direction of a surface of one of the pair of substrates.

10. The liquid crystal display device according to claim 1, wherein the reflector is partially in a non-overlapping condition with the common electrode.

11. The liquid crystal display device according to claim 1, wherein the reflector is partially in a non-overlapping condition with the pixel electrode.

12. The liquid crystal display device according to claim 1, wherein the reflective display region surrounds the transmissive display region.

* * * * *